Dec. 11, 1928.　　　　　　　　　　　　　　　　　1,694,449
F. RICKS ET AL
APPARATUS FOR USE IN ASSEMBLING UPPERS AND INSOLES
Filed Jan. 7, 1922
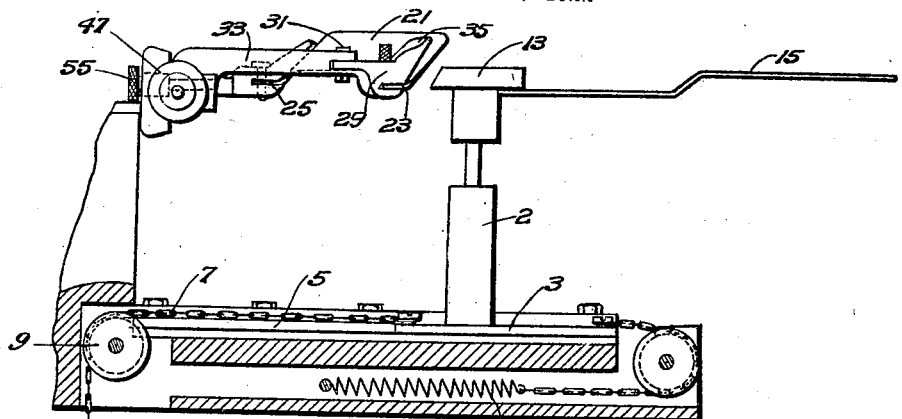
Fig. 1.
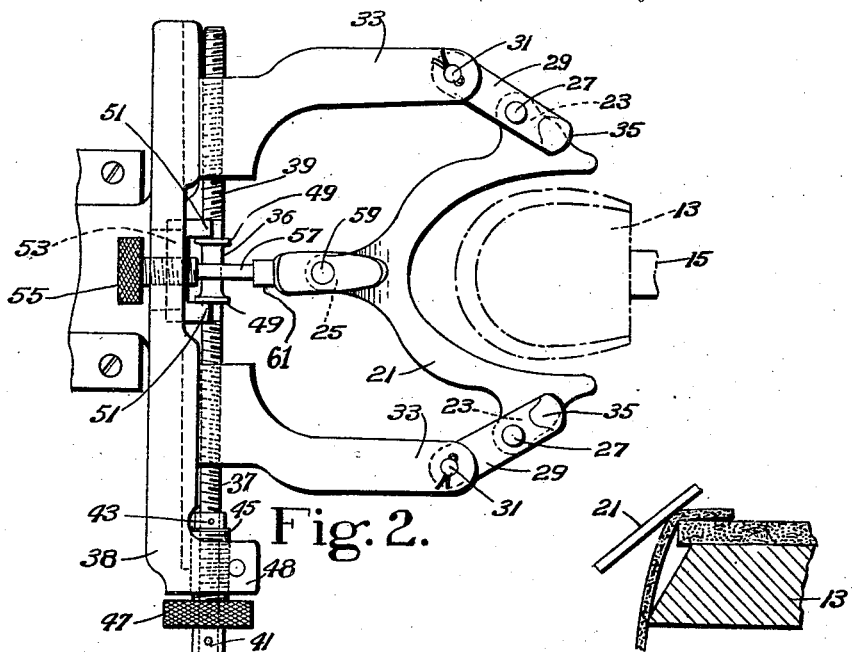
Fig. 2.
Fig. 4.
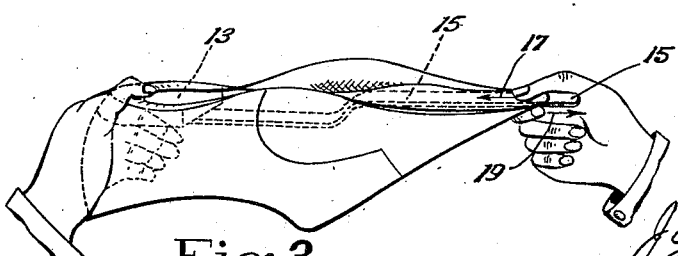
Fig. 3.
INVENTORS
Fred Ricks
Joseph Goldbourn
By their Attorney
Nelson W. Howard Patented Dec. 11, 1928.

1,694,449

UNITED STATES PATENT OFFICE.

FRED RICKS AND JOSEPH GOULDBOURN, OF LEICESTER, ENGLAND, ASSIGNORS TO UNITED SHOE MACHINERY CORPORATION, OF PATERSON, NEW JERSEY, A CORPORATION OF NEW JERSEY.

APPARATUS FOR USE IN ASSEMBLING UPPERS AND INSOLES.

Application filed January 7, 1922, Serial No. 527,623, and in Great Britain January 12, 1921.

This invention relates to the manufacture of shoes, and more particularly, in many of its important aspects, to the assembling of the upper with the insole, sole or other part to which an end of the upper is to be permanently secured, the term "insole" being used herein in an inclusive sense as applicable to any such part, except where the context requires a more limited interpretation of the term.

In one of its aspects the invention has in view the assembling of an insole with an upper which has been previously molded at one or both ends. In the use of machines for molding the heel ends of uppers off the last, for example machines of the type illustrated in United States Letters Patent No. 1,156,897, granted on October 19, 1915, upon an application of Gouldbourn, Bates and Jerram, it has been the practice after the molding operation to throw the uppers in piles where they remain until the operation of assembling them with their insoles on the lasts, an operation which for the sake of economy in last equipment and other considerations it is customary to defer for a considerable time after the molding. Such practice frequently results in more or less distortion of the molded ends of the uppers, so that they must be reshaped to some extent before they are permanently secured to their insoles. This tends to defeat one of the important objects of the molding operation, which is to eliminate the necessity for anything in the nature of a shaping operation on the last at the molded end of the upper, and is also objectionable because of the difficulties encountered in attempting to reshape a part of the upper which has already been once molded. As an alternative, it has been proposed, as set forth in United States Letters Patent No. 1,406,337, granted on February 14, 1922, upon an application of Matthias Brock, to assemble the insole with the molded upper and to fasten the parts together while the upper is on the mold, thus avoiding danger of distortion of the molded end of the upper in the considerable interval which customarily elapses before the upper is mounted on its last. It is an object of this invention, among others, to provide for assembling the insole and the upper and for securing them together before opportunity is afforded for distortion of the upper, without such inconvenience and disadvantages as, under some circumstances, may be involved in the assembling and securing of the parts in the molding machine. It is also an object to assist the workman in positioning an insole and an upper in the correct relation to each other, an operation which, with a molded upper, has always required special care in order to insure that the molded end of the upper shall be properly located in relation to the corresponding end of the last when it is mounted on the last.

With the above and other objects in view, the invention provides a novel apparatus for effecting a speedy and accurate assembling of uppers and insoles. In accordance with the procedure herein illustrated, the upper, after its removal from the mold by which its heel end portion is shaped, is assembled with the insole and is permanently fastened to the heel end of the insole before the upper is mounted on its last. In one aspect the invention provides means for locating the molded end of the upper in the corect relation to the end of the insole by clamping pressure which is substantially localized at the edge of the insole, with the remainder of the molded end of the upper substantially free from pressure, in order to avoid any possibility of distortion of the molded shape of the upper in assembling the parts. The apparatus herein shown comprises a support for the heel end of the insole so shaped as to permit the margin of the insole to project beyond its insole engaging face, together with a device for embracing and pressing the flanged end of the upper inwardly against the edge of the insole and for holding it while the fastening operation is performed. While the invention is not limited in respect to the manner of fastening the upper to the insole, it is contemplated that the molded flange of the upper may be secured by tacks which will be clinched on the member which supports the insole.

In another aspect the invention aims to facilitate the correct assembly of an upper and an insole by the provision of a device which will assist the workman in bringing the parts into the right relation. As herein illustrated, a member is provided which projects between the insole and the toe end of the upper and along which the workman, for example by the use of one hand, may slip the insole rearwardly and the upper forwardly until the heel end of the insole engages properly with the heel end of the upper. With his other hand the workman may at the same time press the molded flange of the upper down upon the heel seat face of the insole. It is contemplated also that the proper angular relation of the upper and the insole may be determined by the use of a member projecting forwardly from the toe and adapted to serve as a sight gage to assist in the proper alinement of the parts. Conveniently such a gage may be afforded by a member such as above mentioned which is adapted further to assist as described in movement of the upper and the insole in opposite directions to bring them into the correct lengthwise relation. In this manner, and by the use of such means as herein illustrated, the molded upper and the insole may be more accurately assembled than would be as readily possible on the last.

The invention in its above mentioned and other aspects will now be more particularly described with reference to the accompanying drawings, which show one form of apparatus embodying novel features of the invention, and will then be pointed out in the claims.

In the drawings:

Fig. 1 is a view of the illustrative apparatus in side elevation, with parts in section;

Fig. 2 is a plan view of the upper portion of the apparatus shown in Fig. 1;

Fig. 3 illustrates diagrammatically the manner of bringing the upper and insole into substantially the right relation before clamping the upper to the edge of the insole, and Fig. 4 is a vertical section showing a portion of the insole support and of the clamp and illustrating the manner of clamping the upper to the edge of the insole.

The apparatus shown comprises a post 2 projecting upwardly from a block 3 mounted to slide in guideways 5 on the top of the column or frame of the apparatus. The block 3 is arranged to be moved rearwardly away from the operator by means of a treadle (not shown) connected to the block by a chain 7 which passes over a pulley 9, and the block is returned to its foremost position by means of a spring 11. On the top of the post 2 and free to swivel on a vertical axis thereon is a horizontal metal block 13 for supporting the heel end of the insole. The insole engaging face of this block is somewhat narrower than the heel end of the insole to permit the marginal edge of the insole to project beyond said face at the sides, and to facilitate such projection of the insole also at its rear end, as well as to assist in positioning the upper about the end of the insole, the block is flared downwardly and outwardly from its insole engaging face at the rear end and at the sides to engage the molded end of the upper and hold it away from the edge of said face, as illustrated in Fig. 4. Extending forwardly from the lower face of the block 13 and fast on the block is a thin metal plate or bar 15 which is so shaped that the upper surface of its front portion is on the same level as the insole engaging face of the block 13 to support the forepart of the insole in the same plane as the heel end portion. By reference to Fig. 2 it will be seen that the comparatively narrow bar 15 is positioned midway between the opposite sides of the block 13, so as to extend along the longitudinal median line of the forepart of the insole when the insole is in the right position.

For clamping the molded end of the upper against the edge of the insole there is provided a heel end embracing band or clamp member 21 of thin spring metal which is sufficiently flexible to permit it to be conformed readily to the curvature of the end of the upper and insole, this member being arranged to engage the opposite side portions of the upper as far forwardly as points in advance of the heel breast line. As shown in Fig. 4, the clamp member or band 21 is flared or inclined downwardly and outwardly so that it effects substantially a line contact with the upper along the edge of the insole and acts to wedge the upper both inwardly against the edge face of the insole and downwardly upon its bottom face, the clamp being arranged to engage the upper substantially along the line where the margin of the upper is turned inwardly over the heel seat, i. e., at the outer boundary of the inturned flange, and opposite to the outer edge corner of the insole. The clamp member has at each end an extension 23, and at its rearmost portion an extension 25, which connect the clamp member, without substantial loss of flexibility in a horizontal plane, to its supporting and controlling devices.

The devices for supporting and controlling the front end portions of the clamp member 21 comprise, at each side of the apparatus, a horizontal link 29 connected to the extension 23 by a vertical pivot 27 and mounted on a vertical pivot 31 on the front end of a rigid supporting arm 33. The front end of each link 29 has on it a boss or abutment 35 which, as that end of the link is swung inwardly by the closing of the clamp, comes into contact with the outer face of the clamp member 21 at the level of the line of contact of the latter with the work and thus buttresses the clamp. The rigid arms 33 are mounted in horizontal slideways in the frame 38 of the apparatus and are internally threaded to receive respectively the right and left hand threaded portions 37, 39 of a screw 36 which extends horizontally across the apparatus. The screw is held against lengthwise displacement by its head 41 and a collar 43 which are fast on the screw and engage respectively the opposite ends of a horizontal screw 45 which is threaded into a boss 48 on the frame 38 and provided with a milled head 47 to facilitate its adjustment. It will thus be seen that the right and left hand screw 36, which passes through the screw 45, is held against endwise movement by the latter and is adjustable by the turning of the screw 45 to shift the arms 33 together laterally of the insole supporting block, while by turning the screw 36 the two arms 33 may be moved in respectively opposite directions to vary their distance apart and consequently the form of the clamp member or band 21.

Between the right and left hand threaded portions of the screw 36 the latter has collars 49 confined between shoulders 51 projecting from a block 53 which is guided to slide horizontally across the apparatus when the screw 36 is moved endwise by adjustment of the screw 45. The block 53 has in it a horizontal screw 55 which extends forwardly toward the clamp and is axially bored so as to receive slidingly the rear end of a rod 57 the front end of which is connected by a vertical pivot 59 to the extension 25 on the clamp member. The rod 57 has a shoulder 61 which is arranged to contact with the front end of the screw 55 for limiting the rearward movement of the middle portion of the clamp member as this member is forced back by the work and for thereby limiting the inward movement of the ends of the clamp member. It is contemplated that the screw 55 will be so adjusted, and the arms 33 will be set at such a distance apart, that when the clamp member has been forced rearwardly as far as permitted by the screw 55 the front ends of the clamp member will be at the proper distance apart to clamp the opposite side portions of the molded end of the upper to the edge of the insole without displacement of the insole.

In the use of the apparatus for assembling an insole and an upper having a molded heel end, the upper is positioned with its molded end about the block 13 and with its forepart under the bar 15, and the insole is placed upon the top of the block 13 with its forepart resting upon the bar 15 and with its heel end under the molded inturned flange of the upper. The workman, as shown in Fig. 3, then insures with one hand that the heel end of the upper is in correct vertical relation to the insole on the support 13, his palm and fingers being free to embrace the heel end of the upper while his thumb is pressed over the flange of the upper and the heel seat portion of the insole. At the same time, by the use of his other hand, he brings the parts into correct longitudinal relation by pressing with his thumb downwardly and rearwardly on the insole, as indicated by the arrow 17, thus sliding the insole rearwardly over the bar 15 which is smooth to permit the insole to slip readily, and simultaneously draws the upper forwardly, as indicated by the arrow 19, by upward and forward pressure of the side of his fore-finger against the upper on the lower smooth surface of the bar. It will be noted by reference to Fig. 3 that the bar 15 is of such length as to project forwardly beyond the end of the insole and the upper, the narrow bar thus serving as a gage whereby the workman may take a longitudinal line of sight along the insole and may see that the toe ends of the upper and insole are in proper position laterally of the end of the bar and the parts thus in proper longitudinal alinement before they are clamped at the heel end.

The upper and the insole having been thus positioned, the workman withdraws his hand from the heel end of the upper and by depressing the treadle moves the support 13 with the upper and the insole rearwardly into the clamp; at the same time holding the parts at the toe end pressed against the bar 15 to prevent their displacement from the proper relation determined. In the rearward movement of the support the rear end of the work is thrust against the intermediate portion of the clamp member which yields and causes the front end portions of the member to be forced in by the links 29 until the clamp is in position to press the upper firmly against the edge of the insole. In this operation the ends 35 of the links 29 are swung rearwardly and inwardly until they engage the clamp member to assist in supporting it against the work. By reason of the inclined relation of the clamp member to the plane of the insole, the member serves to wedge the molded flange of the upper down upon the insole as well as to force the upper against the edge face of the insole, as will be evident by reference to Fig. 4. The clamping pressure is thus localized at the edge of the insole, a result which is further insured by the projection of the edge of the insole beyond the insole engaging face of the block 13. It will be evident, however, that in some of its useful aspects the invention is not dependent upon such projection of the edge of the insole. With the clamping pressure localized at the margin of the insole, there is no substantial tendency to distort in any way the molded shape of the upper in assembling and securing the parts together.

While the parts are held clamped in the manner illustrated in Fig. 4, the upper is fastened to the insole, for example by heel seat tacks which may be driven in any suitable manner, as by the use of a hand tacker. The row of tacks, whereby the molded flange of the upper is permanently fastened to the insole, may extend as far forwardly at each side as is permissible, having regard to the subsequent sewing operation for fastening the upper to the insole at the shank and the forepart. This eliminates the need for any subsequent repositioning of the heel stiffener wings and for any subsequent fastening operation for securing the upper to the insole at the heel seat. If desired, however, the row of tacks may terminate rearwardly of the points at which the row of heel lasting tacks would customarily terminate, in order to leave unsecured parts of the upper which may receive and properly be affected by pulling over or lasting strains applied at the forepart or the shank. The tacks are clinched upon the block 13 which serves as an anvil plate.

After the upper and the insole have been thus secured together the treadle is released and the work support is moved forwardly by the spring 11. The workman then removes the connected upper and insole from the support. At any desired time thereafter the last may be introduced into the shoe and the subsequent operations performed in the manufacture of the shoe, insurance being afforded of no objectionable distortion of the molded end of the upper in the meantime.

While the invention is herein illustrated in its application to the manufacture of a welt or a McKay shoe, it will be understood that the invention is not limited in utility to the manufacture of any particular type of shoe. It will also be evident that in some of its useful and novel aspects the invention is not limited to operation performed at the heel end of the shoe nor to the use of an upper having a previously molded end.

The novel method of assembling uppers and insoles herein disclosed is claimed in a divisional application, Serial No. 175,880, filed on March 16, 1927.

Having described the invention, what we claim as new and desire to secure by Letters Patent of the United States is:

1. An apparatus for assembling an insole with an upper provided with a previously molded end portion having, in combination, means for supporting the corresponding end of the insole off the last, and means for engaging the molded end of the upper substantially at the margin of the insole and for pressing it inwardly against the edge face of the insole while leaving the remainder of the molded end of the upper substantially free from the inward pressure.

2. An apparatus for assembling an insole with an upper provided with a previously molded end portion having, in combination, means for supporting the corresponding end of the insole off the last, and clamping means constructed to embrace the molded end of the upper about the end of the insole with pressure localized substantially at the margin of the insole to position the upper against the edge face of the insole.

3. An apparatus for assembling an insole with an upper provided with a previously molded end portion having, in combination, means for supporting the corresponding end of the insole off the last, and a flexible clamp constructed to effect substantially a line contact with the molded end of the upper about the end of the insole to press the upper inwardly against the edge face of the insole.

4. An apparatus for assembling an insole with an upper provided with a previously molded end portion having, in combination, a support for the corresponding end of the insole constructed to permit the margin of the insole to project beyond its insole engaging face, and means for pressing the molded end of the upper inwardly against the projecting edge face of the insole.

5. An apparatus for assembling an upper and an insole having, in combination, a member for supporting an end of the insole off the last, said member being constructed to permit the margin of the insole to project beyond its insole engaging face at the end and the sides of said face, and means for embracing the corresponding end of the upper and for pressing it inwardly about the projecting edge of the insole.

6. An apparatus for assembling an insole with an upper provided with a previously molded heel end portion having, in combination, a support for the heel end of the insole constructed to permit the margin of the insole to project beyond its insole engaging face at the end and the sides of said face, and clamping means constructed to apply to the molded end of the upper at the end and the sides of said support inwardly directed pressure localized substantially at the margin of the insole to position the upper against the edge face of the insole.

7. An apparatus for assembling an insole with an upper provided with a previously molded end portion having, in combination, a support for the corresponding end of the insole constructed to engage the molded end of the upper and to hold the upper outwardly from the edge of the insole engaging face of said support to permit the insole to project beyond said face, and means for pressing the molded end of the upper inwardly against the projecting edge of the insole.

8. An apparatus for assembling an insole with an upper provided with a previously molded end portion having, in combination, a support for the corresponding end of the insole, said support being flared outwardly to engage the upper and hold it away from the edge of the insole engaging face of the support to permit the insole to project beyond said face, and means for engaging the molded end of the upper with pressure localized substantially at the edge of the insole to position the upper against the projecting edge face of the insole.

9. An apparatus for assembling an insole with an upper provided with a previously molded end portion having, in combination, a support for the corresponding end of the insole having an insole engaging face of less width than the end of the insole, said support being flared outwardly for engagement with the upper to hold it away from the edge of said face, and means for engaging the upper with pressure localized substantially at the margin of the insole to press the upper inwardly round the end of the insole.

10. An apparatus for assembling an insole with an upper provided with a previously molded end portion having, in combination, means for supporting the corresponding end of the insole off the last, and a clamping device constructed to engage the molded end of the upper and press it inwardly against the edge face of the insole, said clamping device being flared outwardly from the periphery of the upper to localize the clamping pressure substantially at the edge of the insole.

11. An apparatus for assembling an insole with an upper provided with a previously molded end portion having, in combination, means for supporting the corresponding end of the insole off the last, and a flexible clamp constructed to embrace the molded end of the upper and press it inwardly about the end of the insole, said clamp being flared outwardly from the periphery of the upper to localize the clamping pressure substantially at the margin of the insole.

12. An apparatus for assembling an insole with an upper provided with a previously molded end portion including an inturned flange having, in combination, means for supporting the corresponding end of the insole off the last, and means for applying to the molded end of the upper pressure directed both inwardly toward the edge face of the insole and transversely of its bottom face and localized substantially at the edge of the insole to position the end of the upper in the correct relation to the insole with its flange against the bottom face of the insole.

13. An apparatus for assembling an insole with an upper provided with a previously molded end portion including an inturned flange having, in combination, means for supporting the corresponding end of the insole off the last, and clamping means having an upper engaging face inclined to the plane of the insole for wedging the molded end of the upper inwardly and downwardly upon the margin of the insole with pressure localized substantially at said margin.

14. An apparatus for assembling an insole with an upper provided with a previously molded end portion including an inturned flange having, in combination, means for supporting the corresponding end of the insole off the last, and a clamping band arranged to embrace the molded end of the upper and having an upper engaging face inclined to the plane of the insole for engaging the end of the upper with pressure localized at the outer boundary of said inturned flange to wedge said flange into engagement with the bottom face of the insole while pressing the upper inwardly against the edge face of the insole.

15. An apparatus for assembling an insole with an upper provided with a previously molded end portion having, in combination, a device for supporting the corresponding end of the insole off the last and about which the molded end of the upper may be located, and clamping means for engaging the molded end of the upper and pressing it inwardly about the end of the insole, said insole supporting device being movable with the insole and the upper to carry the work into operative relation to said clamping means.

16. An apparatus for assembling an insole with an upper provided with a previously molded end portion having, in combination, a support for the corresponding end of the insole constructed to permit said end of the insole to project beyond its insole engaging face and adapted to have the upper positioned thereabout, clamping means for applying to the molded end of the upper inwardly directed pressure substantially localized at the margin of the insole to position the upper in the correct relation to the insole, and means for moving said support with the insole and the upper into operative relation to said clamping means.

17. An apparatus for assembling an insole with an upper provided with a previously molded heel end portion having, in combination, a work support constructed to have an upper and an insole preliminarily assembled thereon off the last and movable rearwardly with the upper and the insole, a flexible clamp member constructed to embrace the molded end of the upper with clamping pressure localized substantially at the margin of the insole to press the upper inwardly about the insole, and controlling means for said clamp member to cause it to close about the end of the insole in response to the pressure of the work as the work support receives its rearward movement.

18. An apparatus for assembling an upper and an insole having, in combination, a member constructed to support the heel end of the insole within the corresponding end of the upper off the last, and a gaging member operatively related to the toe end of the upper and insole and arranged to indicate the correct longitudinal alinement of said upper and insole.

19. An apparatus for assembling an upper and an insole having, in combination, a member for supporting the heel end of the insole within the corresponding end of the upper, and a gaging member extending forwardly from said supporting member in position to lie between the upper and the insole and of a length to project forwardly beyond the toe end of the insole to facilitate correct longitudinal alinement of the upper and the insole.

20. An apparatus for assembling an insole with an upper provided with a previously molded heel end portion including an inturned heel seat flange having, in combination, a member constructed to support the heel end of the insole under said flange of the upper, and a bar extending forwardly from the intermediate portion of the front end of said member in position to lie between the upper and the insole at the toe end, said bar being constructed to serve as a gage relatively to which the toe ends of the upper and insole may be positioned laterally to bring said upper and insole into proper longitudinal alinement.

21. In an apparatus for assembling an upper and an insole off the last, the combination with means for applying pressure to the heel end of the upper to position it in correct relation to the insole, of a member arranged to lie between the toe end portions of the upper and insole and against which the operator may press the upper and the insole to hold them preliminarily while presenting the work to said pressure applying means.

22. In an apparatus for assembling an upper and an insole, the combination with means for supporting the heel end of the insole within the upper off the last, and means for pressing the heel end of the upper inwardly against the edge face of the insole, of a member mounted in position to lie between the toe end portions of the upper and insole and against which the operator may press the upper and the insole to hold said parts in the correct longitudinal relation and prevent displacement of the insole by the pressure applied at the heel end of the upper.

23. In an apparatus for assembling an upper and an insole, the combination with a member for supporting the heel end of the insole constructed to permit the insole to project rearwardly beyond its insole engaging face, and means for applying to the upper inward pressure substantially localized at the margin of the insole to position the upper against the edge face of the insole, of a bar projecting forwardly from said supporting member between the insole and the upper at the toe end and against which the operator may press the insole to prevent displacement of the insole by said pressure on the upper.

24. In an apparatus for assembling an upper and an insole, the combination with means for supporting the heel end of the insole within the upper off the last, and means for applying pressure to the heel end of the upper to position it in correct relation to the insole, of a member mounted in position to support the forepart of the insole and against which the operator may press the upper and the insole to hold them preliminarily for presentation to said pressure applying means, said member being adapted to serve as a gage to facilitate correct longitudinal alinement of the upper and the insole.

25. In an apparatus for assembling an upper and an insole, the combination with a member for supporting the heel end of the insole within the upper, and means for applying pressure to the heel end of the upper to position it in correct relation to the insole, of a bar projecting forwardly from said member to support the forepart of the insole and against which the operator may press the upper and the insole to hold them preliminarily for presentation to said pressure applying means, said bar being of a length to project forwardly beyond the toe end of the insole and adapted to serve as a gage to facilitate correct longitudinal alinement of the upper and the insole.

26. In an apparatus for assembling an upper and an insole, the combination with means for supporting the heel end of the insole within the upper off the last, of a member mounted in position to lie between the toe end portions of the upper and insole and constructed to serve as a guide along which the operator may slip the upper and the insole relatively lengthwise to position them in correct longitudinal relation.

27. In an apparatus for assembling an upper and an insole, the combination with a member for supporting the heel end of the insole within the upper, of a bar projecting forwardly from said member in position to lie between the upper and the insole at the toe end, said bar being constructed to serve as a guide along which the operator by the use of one hand may slip the upper and the insole relatively lengthwise to position them in correct longitudinal relation and adapted also to serve as a gage to facilitate correct longitudinal alinement of the upper and the insole.

28. In an apparatus of the class described, the combination with a work support, of a band for embracing and clamping an end of an upper on said support, members connected to the opposite ends of said band and arranged to close the band inwardly against the sides of the upper in response to pull of the band on said members resulting from lengthwise pressure of the upper against the band, and means for adjustably limiting the movement of said members in response to said lengthwise pressure to control the pressure applied at the sides of the upper.

29. In an apparatus of the class described, the combination with a work support, of a band for embracing an end of an upper on said support, said band being bodily movable in a direction lengthwise of the upper, links connected to the opposite ends of said band and arranged to close said ends inwardly against the sides of the upper in response to lengthwise movement of the band under pressure of the upper, and a device for adjustably limiting said lengthwise movement of the band to control the pressure applied at the sides of the upper.

30. In an apparatus of the class described, the combination with a work support, of a band for embracing an end of an upper on said support, links connected to the opposite ends of said band and arranged to close said ends inwardly in response to lengthwise pressure of the upper against the band, and supports for said links relatively adjustable to vary the contour of the band.

31. In an apparatus of the class described, the combination with a work support, of a band for embracing an end of an upper on said support, links connected to the opposite ends of said band and arranged to close said ends inwardly in response to lengthwise pressure of the upper against the band, members for supporting said links, and means for adjusting said members together in the same direction laterally of the work support and also relatively to each other to vary their distance apart.

32. In an apparatus of the class described, the combination with a work support, of a band for embracing an end of an upper on said support, links connected to the opposite ends of said bands and arranged to close said ends inwardly in response to lengthwise pressure of the upper against the band, members for supporting said links, a right and left hand threaded screw for effecting relative adjustment of said members to vary the contour of the band, and means for moving said screw lengthwise to effect an adjustment of said members in the same direction laterally of the work support.

33. In an apparatus of the class described, the combination with a work support, of a flexible band for embracing and clamping an end of an upper on said support, and means for closing the opposite ends of the band inwardly against the upper including members provided with abutment faces movable relatively to the band into engagement with its opposite end portions to support said end portions in clamping engagement with the upper.

34. In an apparatus of the class described, the combination with a work support, of a flexible band for embracing and clamping an end of an upper on said support, and links connected to the opposite ends of the band and arranged to close said ends inwardly against the upper in response to lengthwise pressure of the upper against the band, said links having abutments thereon arranged to be moved by the links into supporting engagement with the ends of the band as the band is closed about the upper.

In testimony whereof we have signed our names to this specification.

FRED RICKS.
JOSEPH GOULDBOURN.